United States Patent [19]
Damour et al.

[11] Patent Number: 4,714,356
[45] Date of Patent: Dec. 22, 1987

[54] COMPOSITE THRUST BEARING FORMED BY A RADIAL BEARING WITH AT LEAST ONE SEPARATE AXIAL THRUST COLLAR

[75] Inventors: Philippe Damour, St. Jean de la Ruelle; Alain Patoureau, Orleans, both of France; Jack J. Somma, Warren; Ronald J. Thompson, Howell, both of Mich.

[73] Assignee: Federal-Mogul Corporation, Southfield, Mich.

[21] Appl. No.: 853,531

[22] Filed: Apr. 18, 1986

[30] Foreign Application Priority Data

Apr. 22, 1985 [FR] France ................................ 85 06064

[51] Int. Cl.<sup>4</sup> ............................................ F16C 17/10
[52] U.S. Cl. ..................................... 384/275; 384/294
[58] Field of Search ............... 384/296, 275, 294, 288, 384/295

[56] References Cited

U.S. PATENT DOCUMENTS

| 1,759,906 | 5/1930 | Kerruish. |
| 3,361,502 | 1/1968 | Weinkamer et al. ............... 384/294 |
| 3,624,881 | 12/1971 | Brown et al. . |
| 3,713,714 | 1/1973 | Hill et al. . |
| 3,891,287 | 6/1975 | Vogt ................................. 384/288 |
| 4,017,127 | 4/1977 | Smith et al. ........................ 384/295 |
| 4,288,895 | 9/1981 | Campbell . |

FOREIGN PATENT DOCUMENTS

| 2433928 | 7/1974 | Fed. Rep. of Germany . |
| 2433929 | 7/1974 | Fed. Rep. of Germany . |
| 2528576 | 6/1976 | Fed. Rep. of Germany . |
| 1168914 | 10/1969 | United Kingdom . |
| 1386253 | 3/1975 | United Kingdom . |
| 1589322 | 3/1981 | United Kingdom . |

Primary Examiner—Lenard A. Footland
Attorney, Agent, or Firm—Robert F. Hess; Lawrence J. Shurupoff

[57] ABSTRACT

A composite thrust collar for a rotary shaft formed from a radial bearing in which the rotating shaft may rotate and at least one axial thrust collar preventing axial movement of the shaft, characterized in that the radial bearing or the axial thrust collar or collars has at least one boss and in that the radial bearing is fixed to the axial thrust collar or collars by welding along said at least one boss and in that said at least one boss interconnects with the radial bearing or axial thrust collar in such a manner that should the weld break the bearing and collar can not rotate nor be radially disposed relative to one another.

6 Claims, 4 Drawing Figures

COMPOSITE THRUST BEARING FORMED BY A RADIAL BEARING WITH AT LEAST ONE SEPARATE AXIAL THRUST COLLAR

The present invention relates to thrust bearings for rotary shafts, more especially for the crankshafts of an explosion engine or a rotary machine.

It relates more particularly to a composite thrust bearing for a rotary shaft formed from a radial bearing with one or two separate axial thrust collars, the composite thrust bearing being made from at least one multilayer or monometal material.

Solid radial bearings were first of all made which also served as axial thrust collars, machined from solid materials. Then flanged bushes were manufactured and also shouldered bushes, these two types of one piece radial bearings being formed by deforming first of all a monometal than a bimetal strip.

Since such radial bearings had a number of disadvantages (in particular not allowing all types of dimensions, nor the use of different material for the radial bearing and the thrust collar), bearings were then put on the market made from at least two parts, one forming a radial support and the other an axial support for the rotary shaft. Such an arrangement is shown in U.S. Pat. No. 4,017,127 (the subject matter of which is hereby incorporated by reference) and offers the advantage that each of the parts can be made from a different material, the one especially appropriate to the parts; for example an aluminum-tin anti-friction material could be used for the bushing and a copper-lead anti-friction alloy for the flange.

On the other hand, such bearings made from two or more parts presented as a drawback the need to handle several parts and in some cases a risk of error and fitting difficulties although this particular problem is solved by the design shown in the aforesaid U.S. patent. Thus, the positioning of such bearings made from two or more parts in assembly lines usng robots gave rise to problems which were very difficult to solve.

So thoughts turned back to monobloc or one piece type parts from the assembly point of view, but formed from at least two different parts so as to keep the advantages of bearings made from at least two parts.

Thus it was proposed to staple or bond the thrust collar to the radial bearing or to weld the radial bearing and the thrust collar together by means of radial welding bosses provided in the inner diameter of the thrust collar and welded to the outer diameter of the radial bearing.

Stapling presents the drawback of being difficult to perform and of requiring an additional amount of material; bonding presents problems of removing the grease from the parts and forming the bonded joint; finally welding by means of radial bosses is only applicable for half flanges welded to half bushings and requires a considerable chamfer between the bearing face and the inner diameter of the half thrust flange so as to avoid the presence of anti-friction material in the steel to steel welding and so as to avoid interference of the thrust collar with the fillet between the thrust face of the shaft and its radial bearing surface.

The above mentioned drawbacks of radial bearings with at least one axial thrust collar have been overcome by providing a composite thrust bearing for a rotary shaft made from two or more parts (bushing or bearing ring on the one hand, and thrust collar(s) or bearing flange(s) on the other) by joining these parts together by axially welding, by means of bosses, the radial bearing with the axial thrust collar(s).

More precisely, an axially welded composite thrust bearing consists in a radial bearing or an axial thrust collar having at least one boss and in that the radial bearing is joined to the axial thrust collar by axial welding along said at least one boss. Such an arrangement is shown in the assignee related French patent application No. 84 10058, filed June 26, 1984.

The subject invention relates primarily to half bearings and is an improvement over that shown in assignee's French patent application Ser. No. 84 10058 (the subject matter of which is hereby incorporated by reference) and the aforesaid radially welded composite bearing in that it not only offers most of the advantages stated therein of such designs, but, if the weld should break following installation of the bearing, it also offers the means to radially retain the thrust collar on the radial half bearing and to preclude relative rotation of the thrust collar and radial half bearing.

Having such radial retention and anti-rotation features built into the bearing structure itself makes unnecessary any special design of the crankshaft upper and lower housing assemblies.

More specifically the subject invention is characterized by a semicircular thrust collar having a radially inwardly extending boss at each end thereof which interlocks in overfitting relationship with a corresponding but axially wider notch at each end of the associated radial half bearing and wherein the corresponding radial support surfaces of at least one boss and notch provide a line contact type interference with one another to facilitate axial or radial welding.

It is also within the subject invention that only one corresponding boss and notch need be welded whereas the remaining boss and notch need only be in loose interlocking relationship, providing only the radial retention and anti-rotation features desired, such as shown in the aforesaid U.S. Pat. No. 4,017,127.

Of course, the radial bearing on the one hand and the axial thrust collar on the other may be made from similar or more advantageously different materials.

In addition, such a construction will allow the radial bearing to be associated with a complex axial thrust collar which can only be manufactured individually (cut-out of a complex shape or stamping of a surface profile).

These and further objects, features and advantages of the present invention will become more apparent from the following description when taken in connection with the accompanying drawings which shows, for purposes of illustration only, several preferred embodiments in accordance with the present invention, and wherein.

Figure 1:
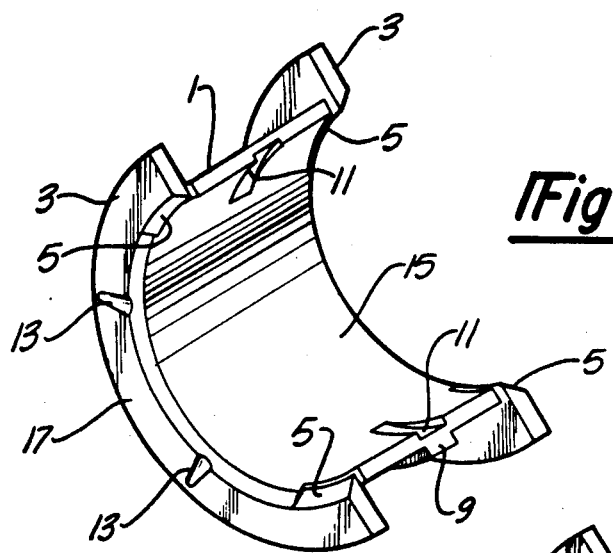
FIG. 1 is an isometric view of an assembled half bearing with two flanges.

In FIG. 1 there is shown half of an assembled double flanged trust-journal bearing comprised of bimetallic strip steel alloy, for both the journal bearing (1) and thrust collars (3), with the journal bearing (1) having a radial support surface (15) and with oil grooves (11) spaced at either end 180° apart. An external lip (9) keys into the housing in which the bearing is to fit and prevents any circumferential and/or axial motion between said journal bearing (1) and said housing. The flanges or thrust collars (3) are keyed to either side of the journal bearing (1) with a boss (5) at each end 180° apart. The thrust load bearing surface (17) is interrupted by oil grooves (13) where oil is admitted to the interface between shaft and collar (3) to form a thrust load bearing oil film. Oil grooves (11) provide the oil film forming function for the radial load bearing surface (15).

Figure 2:
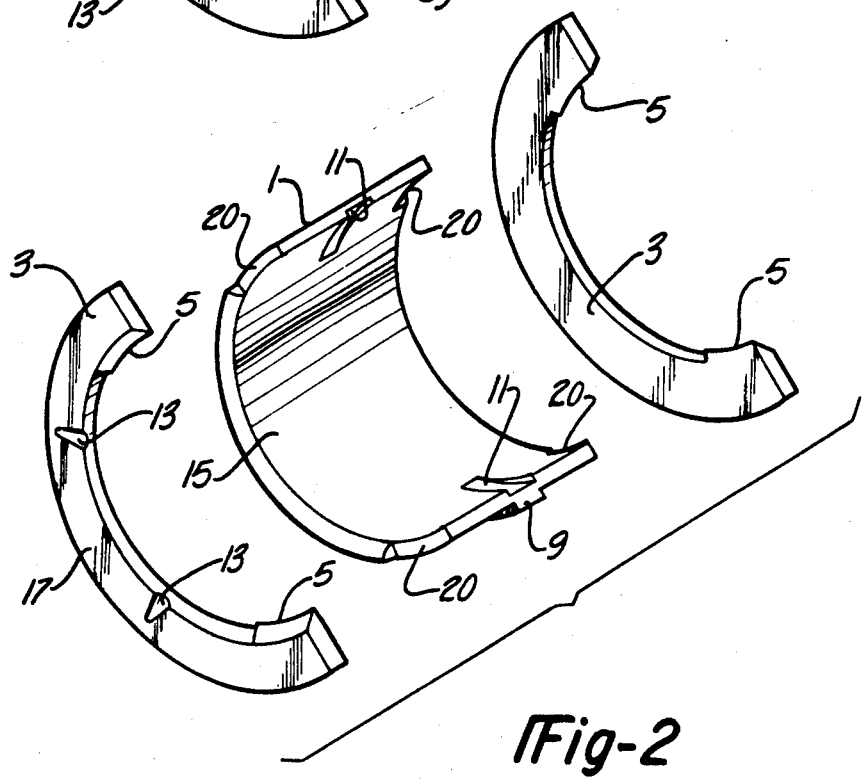
FIG. 2 is an exploded isometric view of the assembly (55) of FIG. 1.

The exploded view of FIG. 1 shown in FIG. 2 shows more clearly the boses (5) on thrust collars (3). FIG. 2 also shows more clearly the matching notches (20) on journal bearing (1) in which bosses (5) of thrust collars (3) fit. Additionally, the journal bearings are extended axially on each end beyond the bearing housing so that the washer is in place with its inside diameter overlaying the outside diameter of the plain bearing and by the interlocking and welded engagement of the respective bosses and notches.

Figure 3:
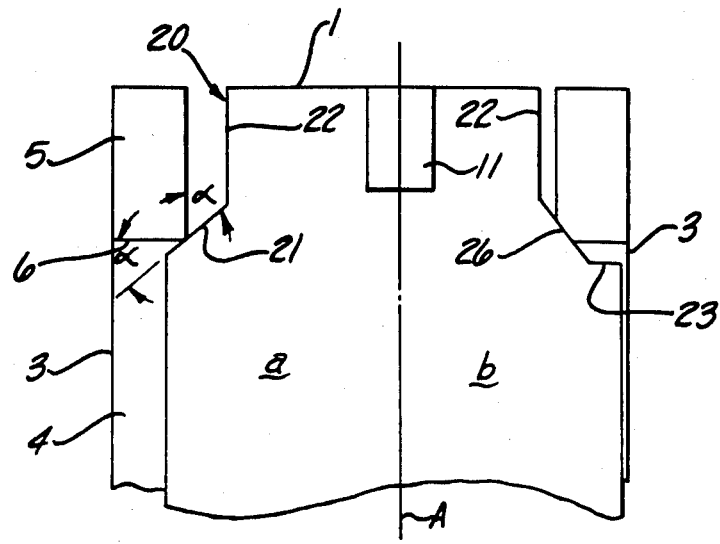
FIG. 3 is a partial front view of bearing assembly before and after axial welding and showing at one side thereof an alternate embodiment.

In FIG. 3 there is shown on one side (a) of axial centerline (A) the relative position of collar (3) to radial bearing (1) prior to the step of axially welding the two bearing parts together. It will be noted that the inner stop shoulder (6) of boss (5) is in line contact with the corresponding axially extending sloped shoulder (21) of notch (20). The angle α at which the boss meets the notch shoulder (21) is important in that it controls the quality of the weld, e.g. the amount of metal which can be welded in an economical and controlled state to form a quality weldment and the degree of movement between collar and radial bearing during welding. The angle α ranging from 20° to 65° is considered permissible and an angle α of approximately 45° is considered most desirable for the particular application shown. Following welding as shown at side (b) of FIG. 3 the weldment (26) will be limited to a minor portion of shoulder (21) and the underside (4) of the collar will radially overhang the axial extremities of radial bearing (1). However the axial inward non-bearing face of collar (3) will be clear of axial shoulder (22) of notch (20).

Also shown at FIG. 3 side (b) is an alternate construction of notch (20) wherein the axially extending sloped shoulder (21) includes an axially extending stop shoulder (23) at its outboard end. The purpose of stop shoulder (23) is to assure that collar (3) will not rotate nor radially drop relative to radial bearing (1) should the weldment (26) break.

With only the sloped shoulder (21) the aforesaid displacement possibilities exist and are solely dependent upon the housing and cranksaft clearance designs.

Figure 4:
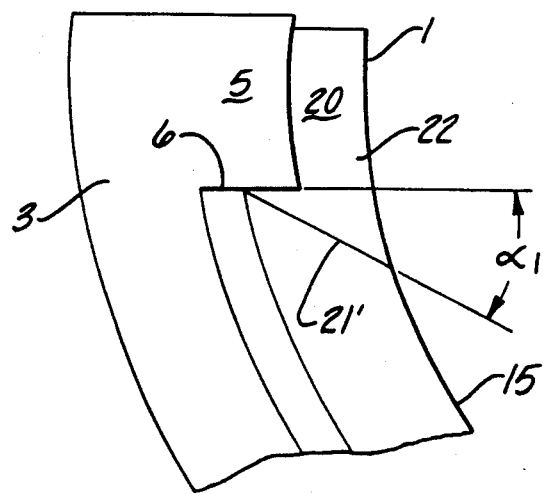
FIG. 4 is a partial side view of still another alternate embodiment of the bearing assembly prior to radial welding.

In FIG. 4 there is shown an embodiment incorporating all features of the subject invention except that the bearing assembly is set up to be joined by radial welding rather than axial welding. Like numerals are used to indicate the same bearing features shown in the previous embodiment of FIGS. 1–3. Rather than the notch shoulder sloping in the axial direction as shown in FIGS. 1–3 the shoulder (21') is sloped in the radial direction. Still the line contact with boss shoulder (6) is provided and the relative angle α, is maintained with the same limits as earlier stated. Other means can be used to establish such line contact in the axial direction. For example one could form the notch by means of displacing the bearing material with a lip punch, thus forming a lip similar to lip (9) but displaced to the extent of providing a line contact interface wtih the stop shoulder (6) of each boss (5).

While we have shown and described only several embodiments in accordance with the present invention, it is understood that the same is not limited thereto but is susceptible of numerous changs and modifications as known to those skilled in the art, and we therefore do not wish to be limited to the details shown and described herein but intend to cover all such changes and modifications as are encompassed by the scope of the appended claims.

We claim:

1. A composite thrust bearing for a rotary shaft comprising at least two members and wherein one such member is a radial half bearing in which the rotating shaft may be supported and rotate and the other such member is an axial thrust collar preventing axial movement of the shaft, said half bearing being of bimetallic strip including a bearing material on the radially inner surface and a steel backing member on the radially outer surface, one such member having a radially extending boss at each radial end thereof, said other member including a notch at each radial end, each said notch having an axially extending shoulder, each said boss extending radially and being received within a respective said notch and having a stop shoulder welded to said axially extending shoulder of each said notch, said axially extending shoulder of each said notch including a sloped shoulder portion in line contact with said boss stop shoulder prior to welding and meeting said stop shoulder at an included angle ranging approximately from 20° to 65° whereby the welding operation is faciliated by said line contact and whereby should the weld break the collar will be loosely retained on the radial half bearing as a result of the interengagement of the stop shoulder with the shoulder of said notch.

2. The composite thrust bearing according to claim 1, characterized in that said sloped shoulder portion slopes in the axial diretion so as to facilitate axial welding.

3. The composite thrust bearing according to claim 2, characterized in that said axially extending shoulder further includes a shoulder portion axially outboard of the sloped shoulder portion and which extends substantially parallel to the axis of the bearing.

4. The composite thrust bearing according to claim 1, characterized in that said sloped shoulder portion slopes in the radial direction so as to facilitate radial welding.

5. The composite thrust bearing according to any of claims 1, 2, 4, or 3 characterized in that the underside of the collar is substantially inboard of the axial ends of the bearing and overlaps the outer diameter of said steel backing member.

6. A composite thrust bearing for a rotary shaft comprising at least two members and wherein one such member is a radial bearing in which the rotating shaft may be supported and rotate and the other such member is an axial thrust collar preventing axial movement of the shaft, said radial bearing being of bimetallic strip including a bearing material on the radially inner surface and a steel backing member on the radially outer surface, one such member having a radially extending boss located generally at one radial portion thereof, said other member including a notch at one radial portion, said notch having an axially extending shoulder, said boss extending radially and being received within said notch and having a top shoulder projection welded to said axially extending shoulder of said notch, said axially extending shoulder of said notch including a sloped shoulder portion in line contact with said boss stop shoulder prior to welding and meeting said stop shoulder at an included angle ranging approximately from 20° to 65° whereby the welding operation is facilitated by said line contact and whereby should the weld break the collar may be loosely retained on the radial bearing in a manner precluding relative rotation of each such member.

* * * * *

UNITED STATES PATENT AND TRADEMARK OFFICE
CERTIFICATE OF CORRECTION

PATENT NO. : 4,714,356

DATED : December 22, 1987

INVENTOR(S) : Philippe Damour, Alain Patoureau, Jack J. Somma, and Ronald J. Thompson It is certified that error appears in the above-identified patent and that said Letters Patent is hereby corrected as shown below:

Abstract, line 11, "disposed" should read "displaced".

Column 2, line 67, "trust" should read "thrust".

Column 4, line 7, "changs" should read "changes".

Column 4, line 34 (Claim 1), "faciliated" should read "facilitated".

Column 4, line 40 (Claim 2), "diretion" should read "direction".

Column 4, line 67 (Claim 6), "top" should read "stop".

Signed and Sealed this

Thirtieth Day of August, 1988

Attest:

DONALD J. QUIGG

Attesting Officer

Commissioner of Patents and Trademarks